US012017397B2

(12) United States Patent
Huang et al.

(10) Patent No.: US 12,017,397 B2
(45) Date of Patent: Jun. 25, 2024

(54) THIXOMOLDING MACHINE, AND METHOD AND DEVICE FOR CONTROLLING TEMPERATURE OF BARREL OF THIXOMOLDING MACHINE

(71) Applicant: Guangdong Yizumi Precision Machinery Co., Ltd., Foshan (CN)

(72) Inventors: Zhibin Huang, Foshan (CN); Yibiao Ou, Foshan (CN); Qihua Liang, Foshan (CN); Tiejun Sui, Foshan (CN)

(73) Assignee: GUANGDONG YIZUMI PRECISION MACHINERY CO., LTD., Guangdong (CN)

( * ) Notice: Subject to any disclaimer, the term of this patent is extended or adjusted under 35 U.S.C. 154(b) by 154 days.

(21) Appl. No.: 17/453,785

(22) Filed: Nov. 5, 2021

(65) Prior Publication Data

US 2022/0143893 A1    May 12, 2022

(30) Foreign Application Priority Data

Nov. 6, 2020    (CN) .......................... 202011232558.4

(51) Int. Cl.
*B22D 17/00*    (2006.01)
*B22D 17/20*    (2006.01)
(Continued)

(52) U.S. Cl.
CPC .............. *B29C 48/92* (2019.02); *B22D 17/00* (2013.01); *B29C 48/832* (2019.02);
(Continued)

(58) Field of Classification Search
CPC ........ B22D 17/00; B22D 17/10; B22D 17/20; B22D 17/30; B22D 17/32
(Continued)

(56) References Cited

U.S. PATENT DOCUMENTS

| 5,758,707 A | 6/1998 | Jung et al. |
| 2004/0144516 A1* | 7/2004 | Liu ...................... B22D 17/007 164/113 |

(Continued)

FOREIGN PATENT DOCUMENTS

| CN | 102398356 A | 4/2012 |
| CN | 113118408 A | 7/2021 |

OTHER PUBLICATIONS

Office Action issued for German Patent Application No. 10 2021 128 837.1, dated Jul. 6, 2022, 13 pages including English machine translation.
(Continued)

*Primary Examiner* — Kevin P Kerns
(74) *Attorney, Agent, or Firm* — HSML P.C.

(57) ABSTRACT

A method and a device are for controlling a temperature of a barrel of a Thixomolding machine. The method includes acquiring a first barrel temperature of the Thixomolding machine, delaying, by the Thixomolding machine, an injection operation when the first barrel temperature is in a preset temperature range, recording a first parameter that indicates consumption of magnesium material in the first barrel of the Thixomolding machine, and increasing the first barrel temperature according to a set rule when the first parameter reaches a first threshold. A Thixomolding machine includes a barrel and is configured to control a temperature of the barrel according to the method.

9 Claims, 3 Drawing Sheets

(51) Int. Cl.
  *B22D 17/32*   (2006.01)
  *B29C 48/80*   (2019.01)
  *B29C 48/92*   (2019.01)

(52) U.S. Cl.
  CPC .............. *B29C 2948/92209* (2019.02); *B29C 2948/924* (2019.02); *B29C 2948/92704* (2019.02); *B29C 2948/92895* (2019.02)

(58) Field of Classification Search
  USPC ................. 164/4.1, 113, 312, 900; 264/40.6
  See application file for complete search history.

(56) References Cited

U.S. PATENT DOCUMENTS

| | | | |
|---|---|---|---|
| 2008/0217817 A1* | 9/2008 | McCullough | B22D 17/007 264/328.2 |
| 2010/0068091 A1* | 3/2010 | Miller et al. | C22C 21/02 164/113 |

OTHER PUBLICATIONS

Plastic Molding Process, Third Edition, edited by Yang Mingbo and Huang Rui, China Light Industry Publishing House, p. 172, Jun. 2014 (5 pages with English translation).
Office Action issued for Chinese Patent Application No. 202011232558. 4, dated Nov. 17, 2023, 8 pages including partial English translation.

* cited by examiner

THIXOMOLDING MACHINE, AND METHOD AND DEVICE FOR CONTROLLING TEMPERATURE OF BARREL OF THIXOMOLDING MACHINE

CROSS-REFERENCES TO RELATED APPLICATIONS

This patent disclosure claims priority to Chinese patent disclosure No. 202011232558.4, both filed on Nov. 6, 2020, the contents of which are hereby incorporated by reference in their entirety.

TECHNICAL FIELD

The present disclosure relates to the technical field of a Thixomolding machine, and in particular, to a Thixomolding machine, and a method and a device for controlling a temperature of a barrel of a Thixomolding machine.

BACKGROUND

A Thixomolding machine is widely used in light and thin 3C products (computer, communication, consumer electronic products and the like) such as mobile phone support plates, protective shells and computer housings.

The semi-solid magnesium alloy Thixomolding machine conventionally includes an injection system, a die closing system, a hydraulic transmission system, an electrical control system, a lubrication system, a heating and cooling system, a safety monitoring system and so on.

The injection system is one of the most important components of the Thixomolding machine. A screw-type injection system is most widely used. In a production cycle of the Thixomolding machine, after a certain amount of a magnesium alloy granular raw material (or referred as magnesium material) is heated to be in a semi-solid state in which solid magnesium alloy and liquid magnesium alloy are mixed, the screw-type injection system can inject the magnesium material in the semi-solid state into a die cavity of a mold by a screw at a certain pressure and speed within a specified time. After the injection, the magnesium material injected into the mold cavity is shaped.

During the injection of the magnesium material, a barrel can transfer heat to the magnesium material to melt the magnesium material at a set temperature. Therefore, the barrel is also provided with a heating system.

The product quality of the Thixomolding machine is directly determined by control precision of process parameters of the injection molding, among which a temperature of the magnesium material in the barrel is a relatively important parameter. Since the temperature of the magnesium material in the barrel cannot be detected, an operator controls the temperature of the magnesium material in the barrel by controlling a heating temperature of the heating system of the barrel.

Since different products requires different molds, different barrel temperatures are required. Therefore, the operator is required to manually adjust the heating temperature of the barrel, which requires high experience of the operator and has great adjusting difficulty.

SUMMARY

According to embodiments of the present disclosure, a method and a device for controlling a temperature of a barrel of a Thixomolding machine, and a Thixomolding machine are provided.

In a first aspect, a method for controlling a temperature of a barrel of a Thixomolding machine includes:
acquiring a first barrel temperature of the Thixomolding machine, wherein the first barrel temperature indicates a temperature of at least part of barrel sections;
delaying, by the Thixomolding machine, an injection operation when the first barrel temperature is in a preset temperature range;
recording a first parameter, wherein the first parameter indicates consumption of magnesium material in the barrel of the Thixomolding machine; and
increasing the first barrel temperature according to a set rule when the first parameter reaches a first threshold.

In one of the embodiments, the method further includes, after increasing the first barrel temperature according to the set rule:
acquiring a first time between completion of each injection and beginning of next injection of the Thixomolding machine; and
decreasing the first barrel temperature when the first time exceeds a second threshold.

In one of the embodiments, the first parameter includes at least of:
the number of molded parts produced by the Thixomolding machine, an injection volume of the barrel, and a feeding volume of the barrel after the Thixomolding machine delays the injection operation.

In one of the embodiments, the first barrel temperature is a barrel temperature of a barrel section below a feeding device of the Thixomolding machine.

In one of the embodiments, the method further includes, before recording the first parameter:
starting a barrel automatic heating and adjusting mode.

In one of the embodiments, the method further includes, before starting the barrel automatic heating and adjusting mode:
determining whether the Thixomolding machine is in an automatic state or a semi-automatic state.

In one of the embodiments, the method further includes:
ending the barrel automatic heating and adjusting mode and decreasing the first barrel temperature when the Thixomolding machine is not in the automatic state or the semi-automatic state.

In one of the embodiments, the increasing the first barrel temperature according to the set rule includes:
increasing the first barrel temperature according to a set threshold.

In a second aspect, a device for controlling a temperature of a barrel of a Thixomolding machine includes:
a first acquisition module configured to acquire a first barrel temperature of the Thixomolding machine, wherein the first barrel temperature indicates a temperature of at least part of barrel sections;
a production module configured to enable the Thixomolding machine to delay an injection operation when the first barrel temperature is in a preset temperature range;
a recording module configured to record a first parameter, wherein the first parameter indicates consumption of magnesium material in the barrel of the Thixomolding machine; and
a temperature adjusting module configured to increase the first barrel temperature according to a set rule when the first parameter reaches a first threshold.

In a third aspect, a Thixomolding machine includes:
a memory configured to store program instructions; and a processor configured to invoke the program instructions stored in the memory to perform the method according to the program instructions.

In the embodiments of the present disclosure, the heating temperature of barrel sections are controlled, so that the magnesium material in the barrel is melted to be in a semi-solid state, and heated at a normal temperature, to ensure that the barrel is not overheated and sintered on the screw to lock the screw. Moreover, during continuous production, the first barrel temperature is increased according to the first parameter and the first threshold, so that the magnesium material in the barrel section fed by the feeding device is heated quickly at a higher temperature to ensure that the magnesium material used for injection has such a temperature that the normal temperature of the magnesium material in the barrel can be ensured and the product yield can be improved during the continuous production.

BRIEF DESCRIPTION OF THE DRAWINGS

In order to more clearly illustrate the technical solutions in the embodiments of the present disclosure, the accompanying drawings to be used in the description of the embodiments will be briefly introduced below. Apparently, the accompanying drawings in the following description are only some embodiments of the present disclosure, and other drawings can be obtained by those of ordinary skill in the art from the drawings without creative efforts.

DETAILED DESCRIPTION OF THE EMBODIMENTS

In order to make the objectives, technical solutions and advantages of the embodiments of the present disclosure clearer, the technical solutions in the embodiments of the present disclosure will be described clearly and completely below with reference to the accompanying drawings in the embodiments of the present disclosure. Apparently, the described embodiments are merely some of rather than all of the embodiments of the present disclosure. All other embodiments acquired by those skilled in the art without creative efforts based on the embodiments in the present disclosure shall fall within the protection scope of the present disclosure.

The terms used in the embodiments of the present disclosure are for the purpose of describing specific embodiments only, and are not intended to limit the present disclosure. As used in the embodiments of the present disclosure and the appended claims, the singular forms of "a/an", "the", and "said" are also intended to include plural forms. "A plurality of" generally includes at least two, unless otherwise clearly indicated in the context.

Depending on the context, the terms "if" and "in case" as used herein may be interpreted as "when", or "once", or "in response to a determination of" or "in response to a detection of". Similarly, depending on the context, the phrase "if it is determined that" or "if detecting (a described condition or event)" may be interpreted as "once it is determined that", or "in response to a determination of", or "once detecting (a described condition or event", or "in response to a detection of (a described condition or event)".

Figure 1:
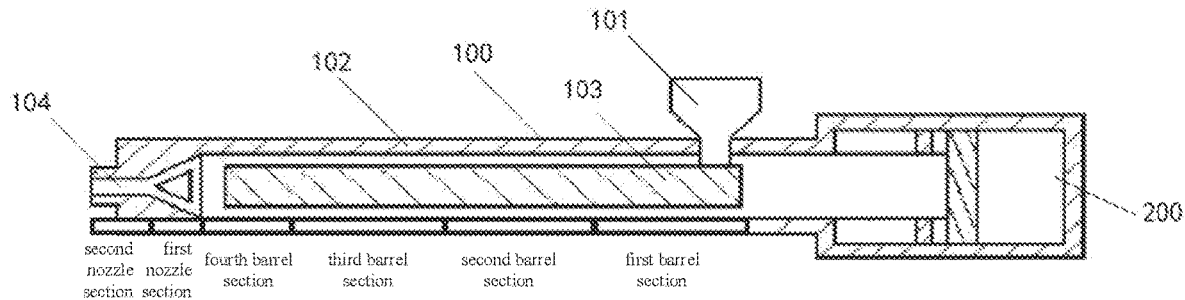
FIG. 1 is a schematic diagram of a Thixomolding machine in the conventional art.

FIG. 1 is a schematic diagram of a Thixomolding machine in the conventional art. A Thixomolding machine includes an injection system 100, a die closing system (not shown) and a transmission system 200. Moreover, the above systems may be controlled by a unified electrical control system. The Thixomolding machine according to the present disclosure may also be any type of Thixomolding machine. In the embodiments of the present disclosure, the Thixomolding machine is taken as a semi-solid magnesium alloy Thixomolding machine as an example.

The transmission system 200 includes a screw 103 configured to drive the injection system 100. In an example, the transmission system 200 includes an injection cylinder, an injection unit carriage cylinder and a screw driving device (feeding motor).

A die closing device of the Thixomolding machine can ensure reliable locking and opening of a forming mold and remove a product, and generally includes a fixed platen, a movable platen, a pull rod, an oil cylinder, a connecting rod, a mold adjustment mechanism, a product ejection mechanism and so on. According to different mold locking operation principles, the Thixomolding machine generally includes a mechanical hydraulic linkage die closing device configured to use a connecting rod to mechanically obtain locking force of the mold, and a direct-pressure die closing device configured to directly produce the locking force of the mold through oil pressure of a mold locking oil cylinder.

The injection system 100 mainly includes components such as a feeding device 101, a barrel 102, a screw 103 and a nozzle 104. The injection system 100 is configured to, after a certain amount of magnesium material in the barrel 102 fed by the feeding device 101 is heated to be in a semi-solid state, inject the magnesium material in the semi-solid state from the nozzle 104 into a die cavity of a mold of the die closing system by the screw 103 at a certain pressure and speed within a specified time.

The barrel 102 can transfer heat to the magnesium material to melt the magnesium material at a set temperature. That is, the magnesium material in the barrel 102 is heated by heating the barrel, and then the barrel 102 transfers the heat to the magnesium material. Therefore, the barrel 102 is further provided with a heating system configured to heat the barrel 102.

The product quality of the Thixomolding machine is directly determined by control precision of process parameters of the injection molding, among which a temperature of the magnesium material in the barrel 102 is a relatively important parameter. Since the temperature of the magnesium material in the barrel 102 cannot be detected, an operator controls the temperature of the magnesium material in the barrel by controlling a heating temperature of the heating system of the barrel 102.

The heating system generally includes devices such as a temperature controller, a temperature sensor and a heating ring. The temperature sensor is configured to detect the temperature of the barrel 102 and transfer the temperature to the temperature controller. The temperature controller controls a heating temperature of the heating ring. In some examples, a plurality of heating rings are used to heat different sections of the barrel respectively to heat the magnesium material in the barrel 102.

For example, in the example shown in FIG. 1, the entire injection system 100 is divided into 6 sections for separate heating control. The barrel 102 is divided into 4 sections from right to left of FIG. 1, which are a first barrel section, a second barrel section, a third barrel section, and a fourth barrel section. The nozzle 104 at an end of the barrel 102 is divided into 2 sections, which are a first nozzle section and a second nozzle section. Each of the above barrel sections or the nozzle sections may be heated by one or more heating rings. In other examples, the barrel 102 and the nozzle 104 may also be divided into other numbers of sections according to different application scenarios, so as to perform segmented heating control.

If the temperature of the barrel 102 is too high, the magnesium material may be sintered on the screw to lock the screw. If the temperature of the barrel 102 is too low, the product yield may be reduced. Since different products requires different molds, different barrel temperatures are required. During actual production, the operator is required to manually adjust the heating temperature of the barrel according to his/her own operation experience, which requires high experience of the operator and has great adjusting difficulty.

Regarding the above technical problems, an embodiment of the present disclosure provides a method for controlling a temperature of a barrel of a Thixomolding machine, which increases a heating temperature of a barrel appropriately during continuous production, to ensure that the magnesium material newly added into the barrel reaches a set temperature, so as to improve the product yield.

Figure 2:
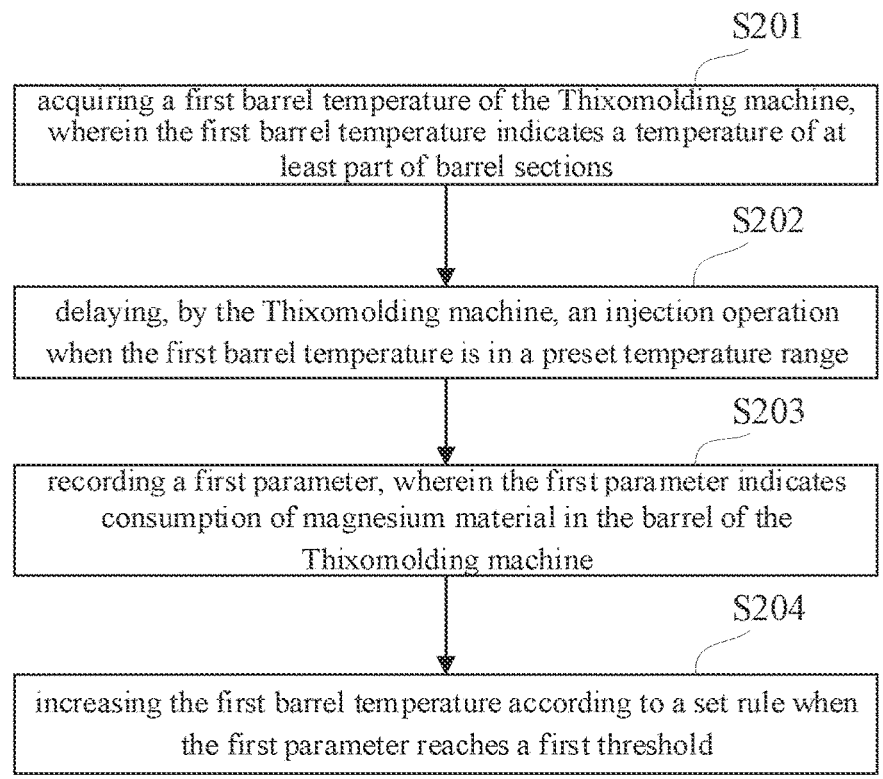
FIG. 2 is a schematic flowchart of a method of controlling a temperature of a barrel of a Thixomolding machine according to an embodiment of the present disclosure.

As shown in FIG. 2, in an exemplary embodiment, the method for controlling the temperature of the barrel of the Thixomolding machine includes the following steps of S201 to S204.

At S201, a first barrel temperature of a Thixomolding machine is acquired. The first barrel temperature indicates a temperature of at least part of the barrel sections.

The first barrel temperature may be a temperature of the whole barrel, or temperatures of one or more consecutive barrel sections of the barrel as shown in FIG. 1, depending on different segmented heating manners of the barrel.

The first barrel temperature may be obtained by detecting an inner wall temperature of the barrel through a temperature sensor. The temperature sensor may be a thermocouple.

At S202, the Thixomolding machine delays an injection operation when the first barrel temperature is in a preset temperature range.

The feeding device 101 in FIG. 1 feeds a certain amount of magnesium material into the barrel 102, and the heating system heats the barrel 102 until the set temperature is satisfied. In this case, cold start protection of the Thixomolding machine is delayed to start, so that magnesium material can be fully heated in the barrel.

The Thixomolding machine starts the injection operation after the delay of the cold start protection ends. Injection molding of the Thixomolding machine is a cyclic process. Each cycle mainly includes: feeding-melting-applying pressure and injecting-cooling the mold-opening the mold and removing the molded part, and closing the mold after removing the molded part, and then next cycle proceeds.

At S203, a first parameter is recorded. The first parameter indicates consumption of the magnesium material in the barrel of the Thixomolding machine.

During the cyclic operation of injection molding of the Thixomolding machine, the feeding device 101 continues to feed the magnesium material into the barrel, and the newly added magnesium is mixed and heated with the previous magnesium material that has been melted to be in the semi-solid state in the barrel. In the prior art, the temperature sensor cannot directly detect the temperature of the melted magnesium material. That is, the temperature sensor cannot directly obtain the temperature of a magnesium material formed by mixing the newly added magnesium and the previous melted magnesium material in the barrel. Therefore, in the embodiment of the present disclosure, the first parameter is recorded to assist in determination.

The first parameter directly indicates the consumption of the magnesium material in the barrel of the Thixomolding machine. That is, the greater the consumption is, the more the magnesium material is added. An approximate temperature of the magnesium material in the barrel may be inferred from the consumption and production time corresponding thereto.

In a specific example, the first parameter may include one or more of: the number of molded parts produced by the Thixomolding machine, an injection volume of the barrel, and a feeding volume of the barrel after the Thixomolding machine delays the injection operation.

The more molded parts produced per unit time, the more the injection volume of the barrel and feeding volume of the barrel, indicating that the greater the consumption of the magnesium material in the barrel of the Thixomolding machine, the lower the temperature of the magnesium material in the barrel.

At S204, the first barrel temperature is increased according to a set rule when the first parameter reaches a first threshold.

The set rule may be specifically as follows. The set first barrel temperature is directly increased by a certain value according to a set threshold, so that the heating system increases the first barrel temperature. In other examples, the set first barrel temperature may also be increased gradually during the production.

The first threshold may be set by a user according to parameters such as a mold size or injecting and molding time.

For example, when the mold is large in size, the first threshold may be set to a lower value if the first parameter is the number of molded parts produced by the Thixomolding machine. When the mold is small in size, the first threshold may be set to a larger value.

In the embodiments of the present disclosure, the heating temperature of the barrel sections are controlled, so that the magnesium material in the barrel is melted to be in the semi-solid state, and heated at a normal temperature, to ensure that the barrel is not overheated and sintered on the screw to lock the screw. Moreover, during continuous production, the first barrel temperature is increased according to the first parameter and the first threshold, so that the magnesium material in the barrel section fed by the feeding device is heated quickly at a higher temperature, to ensure that the magnesium material used for injection has such a temperature that the normal temperature of the magnesium material in the barrel can be ensured and the product yield can be improved during the continuous production.

Figure 3:
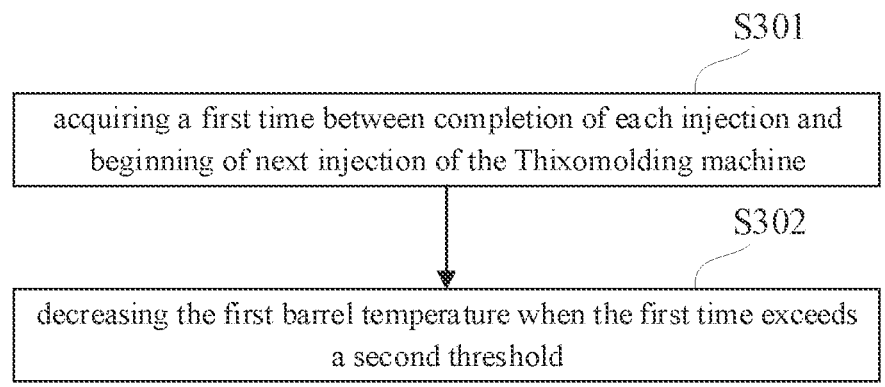
FIG. 3 is a schematic flowchart of a method of controlling a temperature of a barrel of a Thixomolding machine according to an embodiment of the present disclosure.

In an exemplary embodiment, as shown in FIG. 3, after increasing the first barrel temperature according to the set rule, the method further includes the following steps of S301 to S302.

At S301, a first time between completion of each injection and beginning of next injection of the Thixomolding machine is acquired.

At S302, the first barrel temperature is decreased when the first time exceeds a second threshold.

During the operation of the Thixomolding machine, in a full automatic operation mode, the process of opening the mold and removing the molded part is completed automatically, and in a semi-automatic operation mode, the operation of opening the mold and removing the molded part is completed manually. Therefore, the first time may indicate the time spent on opening the mold and removing the molded part. When the Thixomolding machine is in the semi-automatic operation mode, if the operation of opening the mold and removing the molded part takes too much time such that the newly added magnesium material and the previous melted magnesium material in the barrel are fully heated in this period of time, the first barrel temperature may be decreased, and the first parameter is re-recorded and determined. The first barrel temperature may be decreased to a temperature before being adjusted.

In a preferred example, in order to heat the newly added magnesium material as soon as possible, the first barrel temperature is a barrel temperature of the barrel section below the feeding device of the Thixomolding machine, that is, a temperature of the first barrel section in FIG. 1.

In an embodiment, before recording the first parameter, the method further includes the following step:

starting a barrel automatic heating and adjusting mode.

That is, the technical solution according to the embodiment of the present disclosure may be realized by automatic control performed by the electrical control system of the Thixomolding machine.

In an embodiment, before starting the barrel automatic heating and adjusting mode, the method further includes the following step:

determining whether the Thixomolding machine is in an automatic state or a semi-automatic state.

In the automatic state, a main workflow of the Thixomolding machine is performed automatically, while in the semi-automatic state, one or more processes of the workflow are performed manually on the basis of the automatic state. For example, in the automatic state, the following steps are all performed automatically: feeding-melting-applying pressure and injecting-cooling the mold-opening the mold and removing the molded part, and closing the mold after removing the molded part. In the semi-automatic state, the operation of opening the mold and removing the molded part may be performed manually.

The barrel automatic heating and adjusting mode can be started when it is determined that the Thixomolding machine is in the automatic state or the semi-automatic state.

In an embodiment, the barrel automatic heating and adjusting mode is ended and the first barrel temperature is decreased when the Thixomolding machine is not in the automatic state or the semi-automatic state.

Corresponding to and based on the method of controlling the temperature of the barrel of the Thixomolding machine, an embodiment of the present disclosure further provides a device for controlling a temperature of a barrel of a Thixomolding machine. A heating temperature of barrel sections are controlled, so that magnesium material in the barrel is melted to be in the semi-solid state, and heated at a normal temperature, to ensure that the barrel is not overheated and sintered on the screw to lock the screw. Moreover, during continuous production, a first barrel temperature is increased according to a first parameter and a first threshold, so that the magnesium material in the barrel section fed by the feeding device is heated quickly at a higher temperature, to ensure that the magnesium material used for injection has such a temperature that the normal temperature of the magnesium material in the barrel can be ensured and the product yield can be improved during the continuous production.

Figure 4:
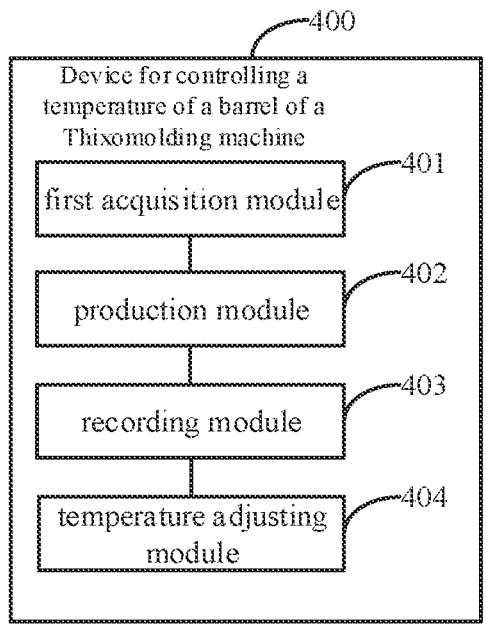
FIG. 4 is a schematic diagram of a device of controlling a temperature of a barrel of a Thixomolding machine according to an embodiment of the present disclosure.

In an exemplary embodiment, as shown in FIG. 4, the device 400 for controlling the temperature of the barrel of the Thixomolding machine includes a first acquisition module 401, a production module 402, a recording module 403, and a temperature adjusting module 404.

The first acquisition module 401 is configured to acquire the first barrel temperature of the Thixomolding machine. The first barrel temperature indicates a temperature of at least part of the barrel sections.

The production module 402 is configured to enable the Thixomolding machine to delay an injection operation when the first barrel temperature is in a preset temperature range.

The recording module 403 is configured to record the first parameter. The first parameter indicates consumption of the magnesium material in the barrel of the Thixomolding machine.

The temperature adjusting module 404 is configured to increase the first barrel temperature according to a set rule when the first parameter reaches a first threshold.

In an exemplary embodiment, the device 400 for controlling the temperature of the barrel of the Thixomolding machine further includes a second acquisition module and a decrease module.

The second acquisition module is configured to acquire a first time between completion of each injection and beginning of next injection of the Thixomolding machine after the first barrel temperature is increased according to the set rule.

The decrease module is configured to decrease the first barrel temperature when the first time exceeds a second threshold.

In an exemplary embodiment, the first parameter includes at least one of: the number of molded parts produced by the Thixomolding machine, an injection volume of the barrel, and a feeding volume of the barrel after the Thixomolding machine delays the injection operation.

In an exemplary embodiment, the first barrel temperature is a barrel temperature of the barrel section below the feeding device of the Thixomolding machine. In an exemplary embodiment, the device 400 for controlling the temperature of the barrel of the Thixomolding machine further includes an automatic mode starting module.

The automatic mode starting module is configured to start a barrel automatic heating and adjusting mode before the first parameter is recorded.

In an exemplary embodiment, the device 400 for controlling the temperature of the barrel of the Thixomolding machine further includes an operation state determining module.

The operation state determining module is configured to determine, before starting the barrel automatic heating and adjusting mode, whether the Thixomolding machine is in an automatic state or a semi-automatic state.

In an exemplary embodiment, the device 400 for controlling the temperature of the barrel of the Thixomolding machine further includes an ending module.

The ending module is configured to end the barrel automatic heating and adjusting mode and decrease the first barrel temperature when the Thixomolding machine is not in the automatic state or the semi-automatic state.

Figure 5:
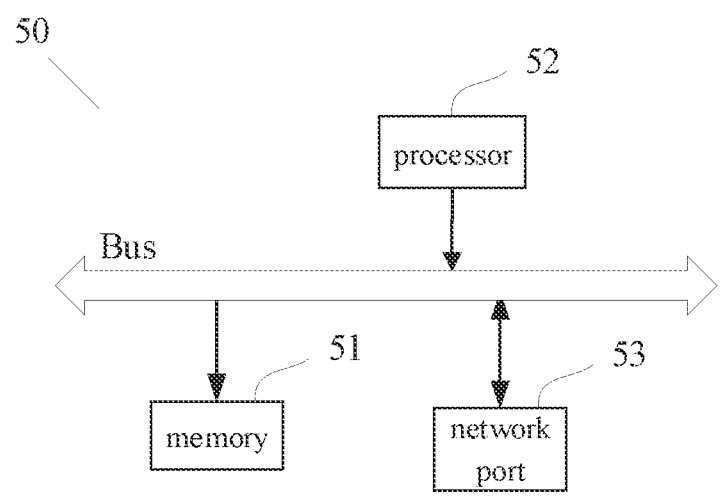
FIG. 5 is a schematic diagram of a Thixomolding machine according to an embodiment of the present disclosure.

The method according to the exemplary embodiments of the present disclosure is illustrated as above. In addition, according to the present disclosure, an exemplary Thixomolding machine 50 is provided, as shown in FIG. 5. The Thixomolding machine 50 includes: a memory 51 configured to store program instructions; and a processor 52 configured to invoke the program instructions stored in the memory to perform the method for controlling the temperature of the barrel of the Thixomolding machine according to any one of the exemplary implementations of the present disclosure according to the program instructions.

The Thixomolding machine further includes a bus connected to the memory 51 and the processor 52, and a network port 53 connected to the processor. The network port is configured to receive or transmit data.

In an exemplary embodiment, the Thixomolding machine is a semi-solid magnesium alloy Thixomolding machine.

Those skilled in the art should understand that the embodiments of the present disclosure may provide a method, a system or a computer program product. Therefore, the present disclosure may be illustrated in a form of hardware only embodiments, software only embodiments, or embodiments with a combination of software and hardware. Moreover, the present disclosure may be illustrated in a form of a computer program product that is implemented on one or more computer-usable storage media (including, but not limited to, a disk memory, a CD-ROM, an optical memory, and the like) that include computer-usable program codes.

The present disclosure is illustrated with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided on a general-purpose computer, a specific-purpose computer, an embedded processor, or a processor of any other programmable data processing device to generate a machine, so that the instructions executed by a computer or a processor of any other programmable data processing device generate a device for implementing a specified function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generates an artifact that includes an instruction device. The instruction device implements a specified function in one or more processes in the flowcharts and/or in one or more blocks in the block diagrams.

What is claimed is:

1. A method for controlling a temperature of a barrel of a Thixomolding machine, comprising:
acquiring a first barrel temperature of the Thixomolding machine, wherein the first barrel temperature indicates a temperature of one or more barrel sections of the barrel;
delaying, by the Thixomolding machine, an injection operation in response to the first barrel temperature being in a preset temperature range, wherein during the delaying of the injection operation, magnesium material is heated in the barrel, and wherein after the delaying of the injection operation, the Thixomolding machine starts the injection operation;
recording a first parameter, wherein the first parameter indicates consumption of the magnesium material in the barrel of the Thixomolding machine; and
increasing the first barrel temperature according to a set rule in response to the first parameter reaching a first threshold.

2. The method according to claim 1, further comprising, after increasing the first barrel temperature according to the set rule:
acquiring a first time between completion of each injection and beginning of next injection of the Thixomolding machine; and
decreasing the first barrel temperature when the first time exceeds a second threshold.

3. The method according to claim 1, wherein the first parameter comprises one or more of:
the number of molded parts produced by the Thixomolding machine,
an injection volume of the barrel, and
a feeding volume of the barrel after the Thixomolding machine delays the injection operation.

4. The method according to claim 1, wherein
the first barrel temperature is a barrel temperature of a barrel section below a feeding device of the Thixomolding machine.

5. The method according to claim 1, further comprising, before recording the first parameter:
starting a barrel automatic heating and adjusting mode.

6. The method according to claim 5, further comprising, before starting the barrel automatic heating and adjusting mode:
determining whether the Thixomolding machine is in an automatic state or a semi-automatic state.

7. The method according to claim 6, further comprising:
ending the barrel automatic heating and adjusting mode and decreasing the first barrel temperature when the Thixomolding machine is not in the automatic state or the semi-automatic state.

8. The method according to claim 1, wherein the increasing the first barrel temperature of the according to the set rule comprises:
increasing the first barrel temperature according to a set threshold.

9. The method according to claim 1, wherein the injection operation includes injection of a portion of the magnesium material from the barrel into a mold.

\* \* \* \* \*